3,399,174
SELF-EXTINGUISHING EPOXY RESINS
Bart J. Bremmer, Midland, Mich., assignor to The Dow
Chemical Company, Midland, Mich., a corporation of
Delaware
No Drawing. Continuation-in-part of application Ser. No.
285,582, June 5, 1963. This application Apr. 28, 1967,
Ser. No. 634,484
11 Claims. (Cl. 260—47)

ABSTRACT OF THE DISCLOSURE

This application is concerned with fire retardant self-extinguishing epoxy resin having terminal 1,2-epoxy groups comprising the ether-ester reaction product of (1) nuclear halogenated meta-hydroxybenzoic acid having from one to three atoms of chlorine or bromine attached to the aryl nucleus and (2) a compound selected from the group consisting of epichlorohydrin, diglycidyl ether, the diepoxide of a polyglycol, and the diepoxy ether of a polyhydricphenol, the reaction product being characterized by having one mole of the compound esterified with the carboxylic group of said acid and having one mole of said compound etherified through the hydroxyl group.

---

This invention relates to fire retardant self-extinguishing epoxy resins and to their method of preparation. More particularly, it concerns a resin containing an ether ester of a nuclear halogenated meta-hydroxybenzoic acid as the flameproofing agent.

This application is a continuation-in-part of U.S. Ser. No. 285,582, filed June 5, 1963, and now abandoned.

Epoxy resins have been used as encapsulating and potting resins for electrical components owing to their high dielectric properties, low cure shrinkage, good adhesion, high resistance to chemicals and moisture, as well as numerous other desirable characteristics. A serious problem associated with the use of these resins in electrical apparatus can be attributed to their flammability. An arc produced by malfunction in the component may ignite the resin and destroy the entire assembly. This problem has been overcome to some extent by using a halogenated bisphenol in preparing the epoxy resin. Owing to the high melting point of the halogenated bisphenols, these resins are either a solid or they have a high viscosity at room temperature so that diluents must be added to produce a low viscosity potting material which enables rapid and complete impregnation of intricate closely spaced components.

It is therefore an object of this invention to produce a fire retardant self-extinguishing epoxy resin having as one embodiment a low viscosity resin suitable for potting and encapsulating electrical components without the use of a diluent. In other embodiments a self-extinguishing resin having a high viscosity or a solid state at normal temperatures is provided for other uses requiring flameproofing.

I have found that a group of epoxy resins having these diverse properties may be produced by reacting a halogenated meta-hydroxybenzoic acid with a compound having an oxirane group in the molecule. The hydroxyl and carboxyl groups in this compound produce ether and ester linkages with oxiranes such as epichlorohydrin and diglycidyl ethers in forming an epoxy resin.

Self-extinguishing properties are generally achieved when the final cured resinous compositions, including curing agents have more than about 15 percent by weight halogen content. Even those resins within the scope of this invention, however, having less than 15 weight percent halogen will exhibit a materially reduced rate of combustion and will require smaller amounts of other external fire retardant agents, such as antimony trioxide, to achieve a self-extinguishing state. Since any external additive will usually have an adverse effect on the strength properties of a resinous composition, that reduction in external fire retardant agent is of significant value to the resin formulator.

The actual percentage of halogen that will appear in the final cured product will vary with the selection of the particular oxirane compound, the amount of curing agent used and the number of halogens on the hydroxybenzoic acid. The meta-hydroxybenzoic acid is unique in that from one to three halogen atoms are easily attached to the benzene nucleus of this difunctional compound thereby providing the halogen concentration necessary for fire retardant and self-extinguishing properties. Either chlorine or bromine may be used to halogenate the benzoic acid, however the bromine compounds generally are more effective as flameproofing agents and are preferred.

A low viscosity self-extinguishing resin may be prepared by reacting epichlorohydrin with 2,4,6-tribromo-3-hydroxybenzoic acid. Epoxy resins which have a higher viscosity or are solid at room temperature may be produced by including a polyphenol as a reactant. For example, the 2,3-epoxypropyl 2,4,6-tribromo-3-(2,3-epoxypropoxy)benzoate produced by reacting epichlorohydrin with the tribromo meta-hydroxybenzoic acid may be reacted with a polyphenol such as bisphenol A to produce a solid resin. A similar resin may be prepared by reacting the diglycidyl ether of a bisphenol with the tribromo meta-hydroxybenzoic acid.

The preparation of these resins may be understood better by reference to the following examples.

Example 1

A reaction chamber equipped with a stirrer, a reflux condenser and means to control the reaction temperature was charged with 75 grams (0.4 equivalent) of 2,4,6-tribromo-3-hydroxybenzoic acid, 185 grams (2 equivalents) of epichlorohydrin and 0.4 ml. of tributylamine. The solution was heated to 80° C. while stirring and kept at that temperature for 6–7 hours to permit all of the acid to produce the corresponding dichlorohydrin derivative. The reactor temperature was then raised to 106–110° C. and 34.9 grams of 50 percent aqueous NaOH gradually added. During this time the mixture of water and epichlorohydrin which distilled from the reactor was separated and the epichlorohydrin returned to the reactor. After all of the caustic had been added, the excess epichlorohydrin was removed by distillation and then replaced with about an equal amount of toluene. The byproduct salt was removed by filtration, the toluene was removed by distillation. After filtering again the final product amounted to 89 grams of a light brown, pourable resin having the following physical properties:

Color (Gardner) _____ 10–11.
Viscosity (Gardner) _____ Slightly over Z–6.
Epoxy equivalent weight, found ____ 269.8.
Epoxy equivalent weight, calculated _ 243.5.
Bromine content, found _____ 47.2%.
Bromine content, calculated _____ 49.2%.

Example 2

A resin was prepared according to the same procedure used in Example 1 using an equivalent amount of 2,4,6-trichloro-3-hydroxybenzoic acid in place of the tribromo acid of Example 1. This resin was a low viscosity, reddish brown liquid having the following properties:

| | |
|---|---|
| Color (Gardner) | 12–13 |
| Viscosity (Gardner) | Y |
| Epoxy equivalent weight, found | 194.6 |
| Epoxy equivalent weight, calculated | 176.7 |
| Chlorine content, found _____percent__ | 29.0 |
| Chlorine content, calculated _____do___ | 30.2 |

Example 3

A reactor of the type used in the above examples was charged with 37.4 grams (0.2 equivalent) of the diglycidyl ether of bisphenol A and 16.9 grams (0.09 equivalent) of 2,4,6-tribromo-3-hydroxybenzoic acid then slowly heated to 160° over a period of about one hour as the reaction took place. During the last five minutes the resin was subjected to a 20″ vacuum to remove volatile materials that might have been present. The resin was then poured onto a flat surface and allowed to cool, becoming a light colored solid having the following properties:

| | |
|---|---|
| Color (Gardner) [1] | 1–2 |
| Viscosity (Gardner) [1] | C |
| Epoxy equivalent weight, found | 526 |
| Epoxy equivalent weight, calculated | 493 |
| Bromine content, found _____percent__ | 19.5 |
| Bromine content, calculated _____do___ | 19.9 |
| Durran's softening point _____° C__ | 79.5 |

[1] Determined with diethylene glycol butyl ether solution containing 40% resin.

Example 4

27.17 grams of a resin of the type produced in Example 1 were placed in an open vessel along with 4.56 grams of bisphenol A then heated to 110° C. while the mixture was stirred until all of the bisphenol was in solution. The solution was then cured to 70° C. and 0.08 of triethylamine added. The mixture was then heated to 165° C. over a period of about 20 minutes and kept at that level for about 10 minutes. It was then poured on a flat surface and allowed to cool and solidify. The resin had the following properties:

| | |
|---|---|
| Epoxy equivalent weight, found | 518 |
| Epoxy equivalent weight, calculated | 527 |
| Bromine content, found _____percent__ | 40.2 |
| Bromine content, calculated _____do___ | 40.3 |
| Durran's softening point _____° C___ | 68.8 |

Resins produced in this manner may be cured to a hard, thermoset material with any of the polyamines and anhydrides of dicarboxylic acids which are commonly used as curing agents for epoxy resins. A resin produced according to Example 1 was mixed with slightly more than a stoichiometric amount of methylene dianiline and subjected to a cure schedule of 2 hours at 90° C., 2 hours at 120° C., 2 hours at 150° C., and one hour at 175° C. The heat distortion temperature of this resin determined according to ASTM test D648–56 was 132° C., the Barcol hardness was 40, and the resin was self-extinguishing according to ASTM test D635–56T for the flammability of rigid plastic over 0.050 inch thick.

A chlorine-containing resin prepared according to Example 2 and cured in the same manner had a heat distortion temperature of 128° C., a Barcol hardness of 35, and was also self-extinguishing.

From the foregoing it can be seen that self-extinguishing epoxy resins having properties ranging from low viscosity liquids to a solid at normal temperatures may be prepared using the halogenated meta-hydroxybenzoic acid as the flameproofing agent. The ratio of oxirane groups to functional groups in the hydroxybenzoic acid in the reaction mixture should be from about 1:1 to about 5:1 with the lower ratio producing little chain termination and favoring the formation of high molecular weight thermoplastic resins. The higher ratios provide more effective chain termination and lower molecular weight polymers with occasional crosslinking between the hydroxyl groups. Epichlorohydrin reacts with the functional groups of the hydroxybenzoic acid in the presence of caustic producing sodium chloride and an ether ester having two oxirane groups as illustrated following.

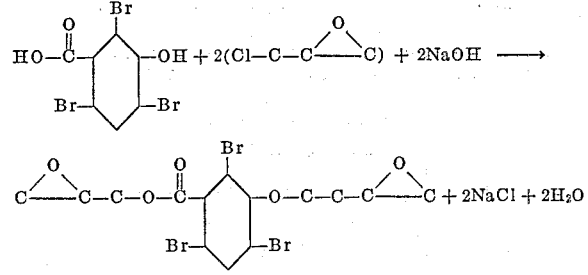

The oxirane groups of diglycidyl ethers react with the functional groups of the hydroxybenzoic acid in the following idealized manner.

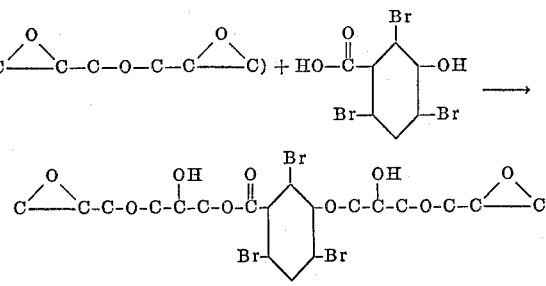

Thus, the ether ester has oxirane groups at the ends of the molecule, providing a means to crosslink the molecules into a thermoset resin. High molecular weight polymers will be produced according to the above idealized scheme by the alternate sequence of diglycidyl ether and hydroxybenzoic acid moieties in the polymer chain.

It should be understood that the examples described herein are not presented as limitations on this invention, but are given for the purpose of illustration only. In addition to bisphenol A and its diglycidyl ether described herein, many of the compounds which are commonly used to prepare epoxy resins may be used in accordance with this invention. Suitable alternatives include diglycidyl ether, diepoxy polyglycols, and the polyphenols such as resorcinol, hydroquinone, bisphenol F, 4,4′-dihydroxybiphenol and dihydroxyl diphenyl sulfone, as well as the diglycidyl ethers of these polyphenols.

I claim:

1. A self-extinguishing epoxy resin having terminal 1,2-epoxy groups comprising the ether-ester reaction product of (1) nuclear halogenated meta-hydroxybenzoic acid having from one to three atoms of chlorine or bromine attached to the aryl nucleus and (2) a compound selected from the groups consisting of epichlorohydrin, diglycidyl ether, the diepoxide of a polyglycol, and the diepoxy ether of a polyhydric phenol the product characterized by having one mole of said compound esterified with the carboxyl group of said acid and having one mole of said compound etherified through the hydroxyl group.

2. A self-extinguishing epoxy resin according to claim 1 wherein said nuclear halogenated meta-hydroxybenzoic acid is 2,4,6-tribromo-3-hydroxybenzoic acid.

3. A self-extinguishing epoxy resin according to claim 1 wherein said nuclear halogenated meta-hydroxybenzoic acid is 2,4,6-trichloro-3-hydroxybenzoic acid.

4. A self-extinguishing thermoset epoxy resin produced by combining about 2 moles of epichlorohydrin with one mole of a 2,4,6-trihalo-3-hydroxybenzoic acid to produce a 2,3-epoxypropyl, 2,4,6-trihalo-3(2,3-epoxypropoxy)benzoate then curing said resin to produce crosslinking thereof by heating in the presence of a diamine at a temperature in the range of approximately 90–175° C. for a length of time sufficient to produce said crosslinking.

5. A self-extinguishing thermoset epoxy resin according to claim 4 wherein said 2,4,6-trihalo-3-hydroxybenzoic acid is 2,4,6-tribromo-3-hydroxybenzoic acid.

6. A self-extinguishing thermoset epoxy resin according to claim 4 wherein said 2,4,6-trihalo-3-hydroxybenzoic acid is 2,4,6-trichloro-3-hydroxybenzoic acid.

7. A self-extinguishing epoxy resin as claimed in claim 4, produced by reacting about 2 moles of epichlorohydrin with one mole of a 2,4,6-trihalo-3-hydroxybenzoic acid to produce the diglycidyl ether ester of said hydroxybenzoic acid, then reacting said diglycidyl ether ester with a polyhydric phenol to produce said epoxy resin.

8. A self-extinguishing epoxy resin as claimed in claim 4, produced by reacting one mole of 2,4,6-tribromo-3-hydroxybenzoic acid with from 2–10 moles of the diglycidyl ether of 2,2-bis(4-hydroxyphenyl)propane.

9. A self-extinguishing epoxy resin as claimed in claim 4, produced by reacting one mole of 2,4,6-trichloro-3-hydroxybenzoic acid with from 2–10 moles of the diglycidyl ether of 2,2-bis(4-hydroxyphenyl)propane.

10. A low viscosity self-extinguishing epoxy resin as claimed in claim 4, produced by reacting about 2 moles of epichlorohydrin with one mole of 2,4,6-tribromo-3-hydroxybenzoic acid in the presence of NaOH.

11. A low viscosity self-extinguishing epoxy resin as claimed in claim 4, produced by reacting about 2 moles of epichlorohydrin with one mole of 2,4,6-trichloro-3-hydroxybenzoic acid in the presence of NaOH.

References Cited
UNITED STATES PATENTS

| | | | |
|---|---|---|---|
| 2,925,426 | 2/1960 | Schroeder | 260—348 |
| 3,058,946 | 10/1962 | Nametz | 260—47 |

WILLIAM H. SHORT, *Primary Examiner.*

T. D. KERWIN, *Assistant Examiner.*